United States Patent
Birchall

[11] 3,979,739
[45] Sept. 7, 1976

[54] APPARATUS FOR THE DETECTION OF VIBRATION IN ROTATING MACHINERY

[76] Inventor: Donald Jack Birchall, c/o D J Birchall Limited, Chiswick Ave., Mildenhall, Suffolk, England

[22] Filed: May 7, 1975

[21] Appl. No.: 575,312

[30] Foreign Application Priority Data
May 7, 1974 United Kingdom............. 20159/74

[52] U.S. Cl................................ 340/261; 340/269; 340/267 R; 73/71.4; 307/117
[51] Int. Cl.² ....................................... G08B 21/00
[58] Field of Search............. 340/261, 269, 267 R; 307/117; 73/71.4; 328/127

[56] References Cited
UNITED STATES PATENTS

| | | |
|---|---|---|
| 3,201,776 | 8/1965 | Morrow et al. .................... 340/261 |
| 3,455,148 | 7/1969 | Foster et al. ...................... 340/261 |
| 3,550,018 | 12/1970 | James et al. ...................... 328/127 |
| 3,579,220 | 5/1971 | Stevenson, Jr. ................... 340/261 |
| 3,913,085 | 10/1975 | Farstad ............................. 340/261 |
| 3,922,663 | 11/1975 | Lubke et al. ...................... 340/261 |

*Primary Examiner*—Glen R. Swann, III
*Attorney, Agent, or Firm*—Seidel, Gonda & Goldhammer

[57] ABSTRACT

A transducer generates a signal whose amplitude corresponds to the vibration amplitude of a machine under test. The output of the transducer is passed to a comparator which gives a logic 1 output when the transducer output signal lies outside an acceptable range, and a logic 0 output when it falls within the range. If a logic 1 output occurs, the length of time for which it persists is measured and, if it persists for greater than a preset time, an alarm is actuated.

6 Claims, 4 Drawing Figures

APPARATUS FOR THE DETECTION OF VIBRATION IN ROTATING MACHINERY

BACKGROUND OF THE INVENTION

The present invention relates to apparatus for the detection of vibration in rotating machinery.

Rotating machinery vibrates at a level dependent upon wear and imbalance in the rotating parts, assuming constant operating conditions. It is possible therefore to use vibration detection as a means of monitoring the mechanical condition of rotating machines and anticipate impending failures. Detection apparatus may be designed automatically to operate an alarm when the vibration has reached a certain predetermined level.

Such automatic alarm systems must, however, be insensitive to extraneous interference which could activate the alarm. Common mode interference, such as noise, can be reduced by means of bandpass filters tuned to the vibration frequency of the machine under test. Series mode interference in the form of transitory pulses can be discriminated against by introducing a low-pass filter in the path of the vibration signal.

SUMMARY OF THE INVENTION

The present invention seeks to provide an improved vibration detection apparatus.

In accordance with the invention there is provided apparatus for the detection of vibration in rotating machinery, said apparatus comprising means for generating an electrical signal indicative of the vibration amplitude of a machine under test, a comparator operable to generate an output indicative of whether the amplitude of said signal exceeds a predetermined level and means for indicating whether said signal exceeds said predetermined level for greater than a predetermined time interval.

The indicating means may comprise means for delaying the signal for said predetermined time interval should it exceed said predetermined level and if, at the end of the period the signal is still above the predetermined level, providing an indication. Such an indication may comprise the sounding of an alarm and/or the shutting-off of the machinery under test. In this way transitory interference of duration less than said predetermined period fails to provide an indication.

The indicating means may comprise an integrator whose output is connected to a further comparator, which further comparator gives an output indicative of whether the integrator output amplitude exceeds a further predetermined level. The output of the integrator is normally clamped at a low level below said further predetermined level, but starts to rise as soon as the first-mentioned comparator indicates that the signal is above the first-mentioned predetermined level. If the signal remains above this predetermined level for a long enough period, the output of the integrator will eventually reach said further predetermined level. The integrator thus provides a delay corresponding to said predetermined time interval after the signal starts to exceed the first mentioned predetermined level before the further comparator provides an indication that the signal has exceeded this level.

In a preferred embodiment of the invention, the output from the further comparator is fed back to the input of the first-mentioned comparator so that, should the signal exceed said first-mentioned predetermined level for greater than said predetermined period, the apparatus will lock in this condition. Thus, for example, the alarm continues even if the signal subsequently falls below said predetermined level.

The generating means may generate a signal in accordance either with the displacement or the velocity of the machine under test. Alternatively, both may be simultaneously tested by providing the apparatus with two channels, each channel comprising a generating means, a comparator and an indicating means. One of the channels measure displacement and the other velocity.

BRIEF DESCRIPTION OF THE DRAWING

In order that the invention may be better understood, several embodiments thereof will now be described by way of example only and with reference to the accompanying drawings in which.

DESCRIPTION OF THE PREFERRED EMBODIMENTS

Figure 1:
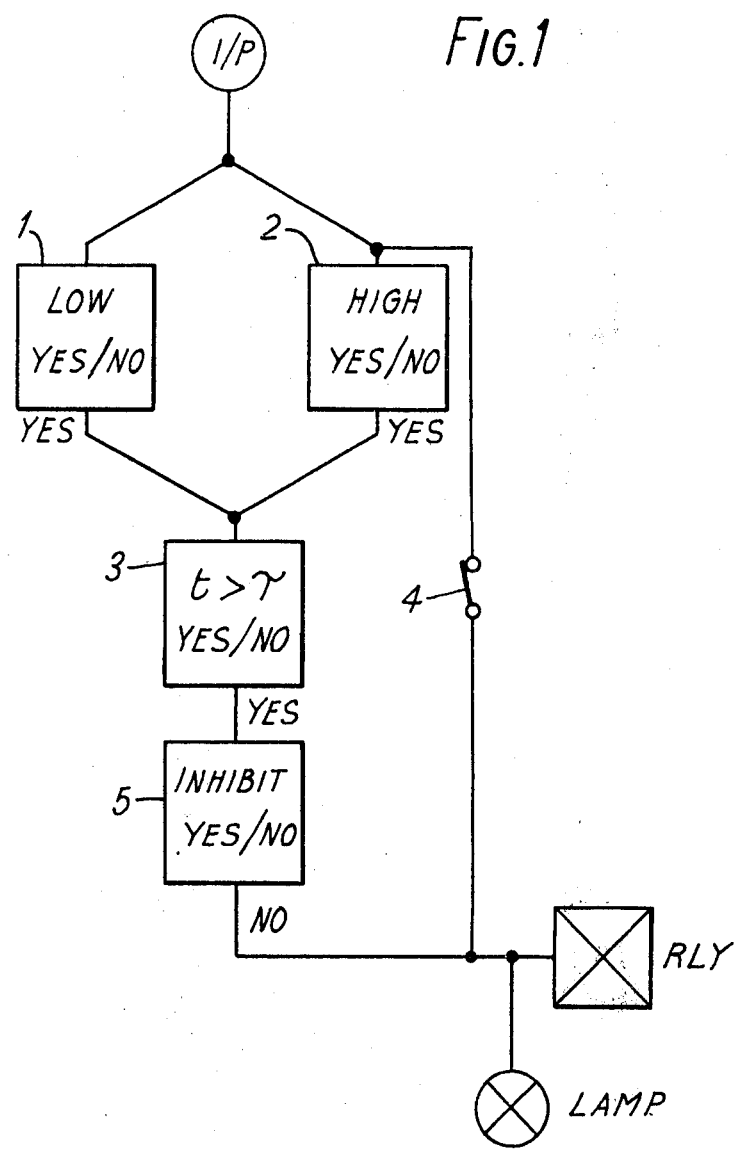
FIG. 1 is a truth table of one embodiment of an apparatus according to this invention.

Referring to FIG. 1, an input signal (I/P) whose amplitude is representative of the amplitude of vibration of a machine under test is passed to two voltage comparators 1 and 2. Comparator 1 indicates whether the input signal is below or above a predetermined low reference level — YES for below; NO for above. On the other hand, comparator 2 indicates whether the input signal is above a second predetermined reference level, higher than the first — YES for above; NO for below. By using two comparators in this way, the incidence of vibration outside a band defined by the reference levels of the two comparators can be detected.

The outputs from the comparators 1 and 2 are passed to an interval comparator 3. This latter detects whether the input signal lies outside the band defined by the reference levels of comparators 1 and 2 for greater than a predetermined time period T. If the input signal does remain outside the band for greater than the predetermined period an alarm is actuated and the output from the comparator 3 is fed back to the input of comparator 2 so that the system is locked in the alarm condition. Thus, even if the input signal subsequently reverts to within the acceptable band, the alarm condition will remain until the system is reset by means of a reset switch 4.

It is normally necessary to de-activate the system under the start-up conditions of the machine under test. An inhibit function 5 is included for this purpose.

One disadvantage of the system of FIG. 1 is that it fails to discriminate between the condition when the input signal lies below the acceptable band and the condition when the input signal lies above the acceptable band. The two conditions require different remedial action, the low fault condition being synonymous with a monitoring failure. The system of FIG. 2 has been evolved to meet this need.

Figure 2:
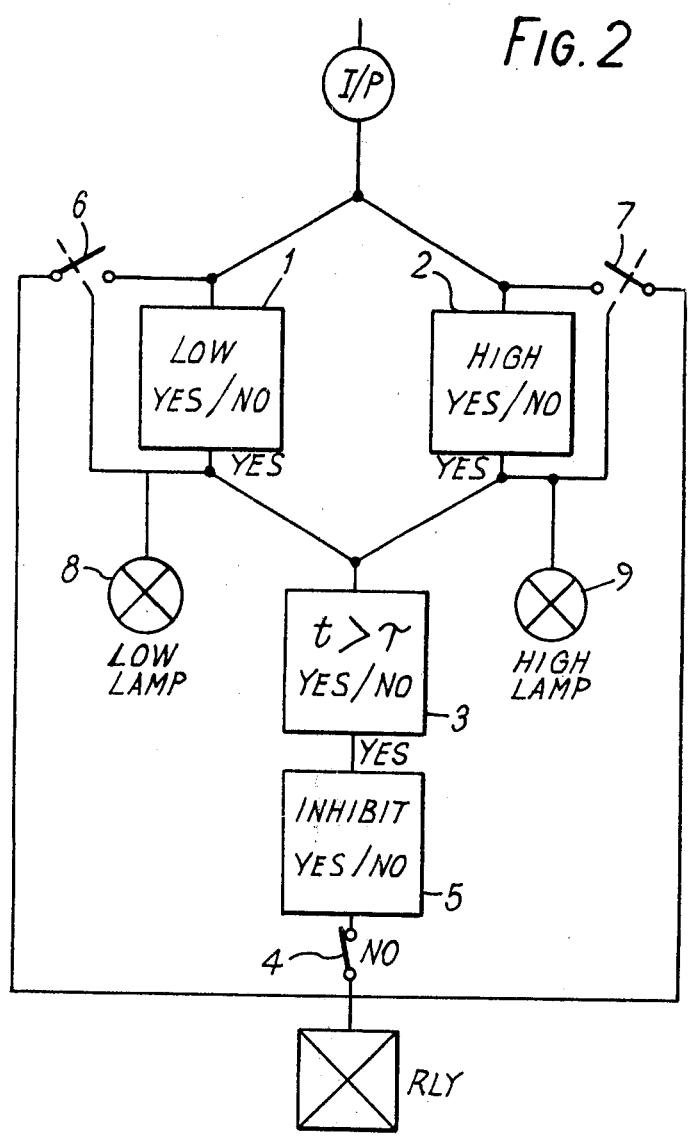
FIG. 2 is a truth table of a further embodiment of an apparatus according to this invention.

The system of FIG. 2 is similar to that of FIG. 1 with the exception that the output of the comparator 3 is passed to the input of one or the other of the comparators 1 and 2. Which comparator 1 or 2 is selected depends upon the actuation of the normally open switches 6, 7 in the feedback lines. Should the input signal fall below the acceptable band, the output from comparator 1 closes the switch 6 and activates a "low" lamp 8. The output of comparator 3 is thus passed to the input of comparator 1. Similarly, should the input signal rise above the acceptable band, the output from comparator 2 closes the switch 7 and activates a "high" lamp 9. The output of comparator 3 is thus passed to the input of comparator 2.

Figure 3:
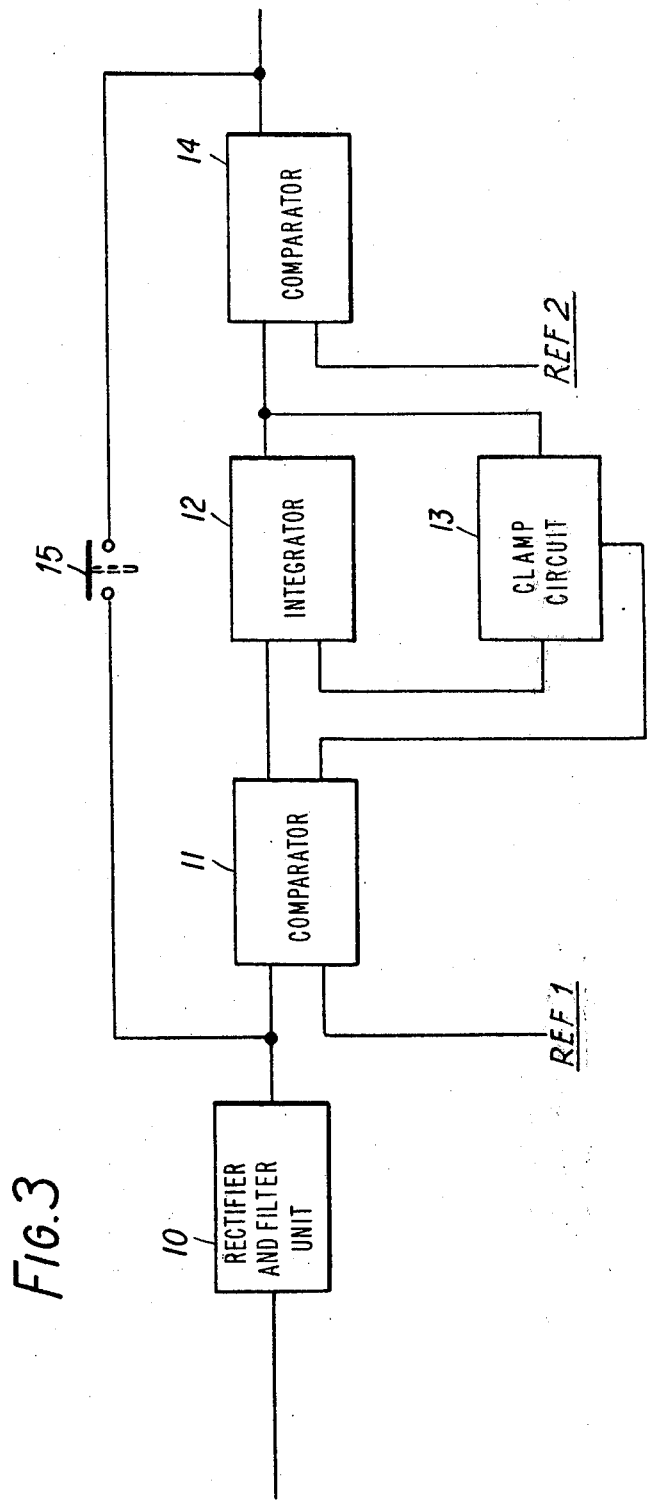
FIG. 3 is a block diagram showing an embodiment of an apparatus according to this invention.

FIG. 3 is a block diagram showing a further embodiment of an apparatus according to this invention. An input signal whose amplitude is dependent upon the vibration of the machine under test (not shown) is derived by means of a suitable transducer (also not shown). The transducer output is in the form of an a.c. signal which is rectified and smoothed in a rectifier and filter unit 10. The output of unit 10 is the average or r.m.s. value of the input signal. The output from unit 10 is passed to a voltage comparator 11 in which it is compared with a reference voltage source REF 1. For inputs below the reference level, the output of comparator 11 is logic 0. For inputs above the reference level, the comparator output is logic 1.

The output from comparator 11 is passed to an integrator 12. When the output of comparator 11 is logic 0, the output of integrator 12 is clamped to logic 0 by means of a clamp circuit 13. When the output of comparator 11 is logic 1, the clamp circuit is disconnected and the integrator therefore integrates the logic 1 input to give an output rising linearly with time. The output from the integrator is passed to a further voltage comparator 14 where it is compared with a second reference voltage source REF 2. For inputs below the reference level REF 2 the output of comparator 14 is logic 0. For inputs above the reference level, the comparator output is logic 1.

At a time interval T after the commencement of integration the output of integrator 12 will reach the reference level REF 2 and the output of comparator 14 will switch from logic 0 to logic 1. The logic 1 output of comparator 14 corresponds to a fault condition and an alarm or other warning is sounded. The alarm condition is reached only after an uninterrupted period T of integration of integrator 12. Should the output of comparator 11 revert to logic 0 before the end of the period T the clamp circuit 13 is reactivated and resets the output of integrator 12 to logic 0. The output of comparator 14, as well as activating an alarm (not shown), is fed back to the input of comparator 11. Logic 1 at the output of comparator 14 is sufficient to maintain comparator 11 at logic 1 output irrespective of the signal level from unit 10. Thus the alarm condition is irreversible, and may only be stopped by means of a reset switch 15 in the feedback path.

Figure 4:
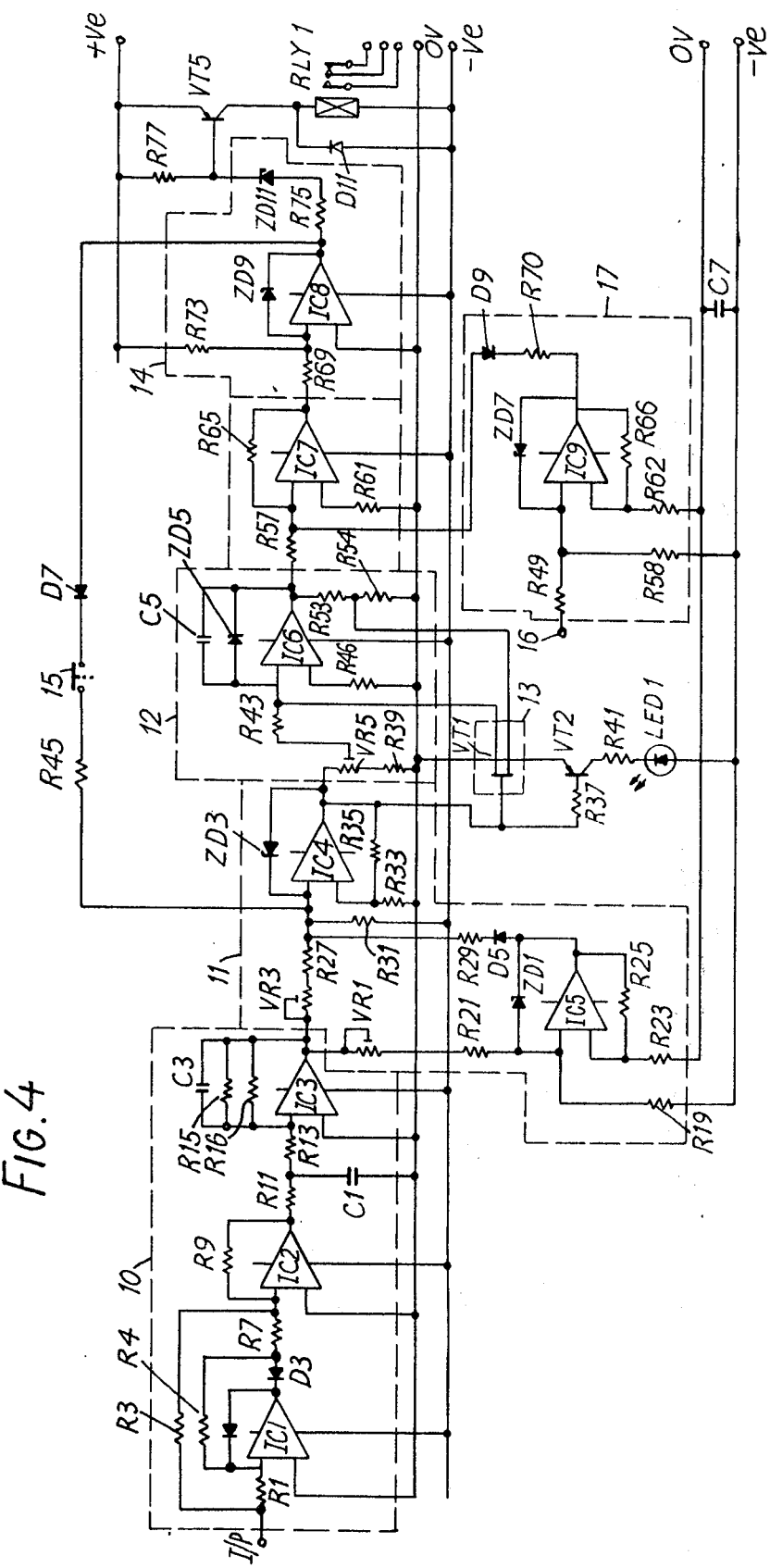
FIG. 4 is a detailed circuit diagram of the embodiment of FIG. 3.

Referring now to FIG. 4, the rectifier and filter unit 10 comprise a pair of operational amplifiers IC1 and IC2 constituting a linear two-phase rectifier and a further operational amplifier IC3 constituting a low pass filter. The output of amplifier IC3 is passed to the voltage comparator 11 which comprises two operational amplifiers IC4 and IC5. The comparator 11 comprises two separate circuits. The first circuit comprises the amplifier IC5 with a zener diode ZD1 connected from the output to the inverting input. Logic 1 at the output of amplifier IC5 corresponds to the reverse bias voltage of this zener diode. For example, for an 8.2V zener diode, logic 1 will be +8.2V. Logic 0 at the output of amplifier IC5 corresponds to the forward bias voltage of the zener diode — i.e., about −0.7V. A reference voltage is derived from the negative supply line via a resistor R19. Backlash is introduced by feeding a portion of the output voltage through a resistor R25 to the non-inverting input of the amplifier IC5. The amount of backlash can be varied in accordance with the ratio of the resistors R23 and R25.

The amplifier IC5 and its associated components thus act as a voltage comparator, the output switching from logic 0 to logic 1 when the input voltage crosses a preset voltage determined by the supply voltage and the ratio of resistors R19 and the combination VR1 and R21. The transfer equations of amplifier IC5 are as follows:

$$e_{in} < \frac{Es(VR1 + R21)}{R19} \rightarrow \text{Logic 1 output}$$

$$e_{in} > \frac{Es(VR1 + R21)}{R19} \rightarrow \text{Logic 0 output}$$

where $e_{in}$ is the output voltage of amplifier IC3, $Es$ is the negative supply voltage. Amplifier IC5 thus acts as the low comparator 1 of FIGS. 1 and 2. The output of amplifier IC5 is passed via diode D5 and resistor R29 to the input of amplifier IC4 where the output of amplifier IC5 is summed with the output of amplifier IC3. The diode D5 is included in order to eliminate the aforementioned logic 0 offset of 0.7V, thus making logic 0 zero volts. This climinates error in the summation of the analogue output of amplifier IC3 and the logic output of amplifier IC5. It will be seen that the circuitry associated with amplifier IC4 is identical to that of amplifier IC5 with the exception that the feedback zener diode ZD3 is reversed in direction. The effect of this is to reverse the respective polarities of logic 1 and the logic 0 offset of 0.7V. Apart from this, the circuit operates in an identical manner to that of amplifier IC5 and will not be described further. The inverting input of amplifier IC4 also receives the logic output of the comparator 14 (to be described in more detail below).

The transfer equations for amplifier IC4 are as follows:

$$e_{in} < \frac{Es(VR3 + R27)}{R31} \rightarrow \text{Logic 0 output}$$

$$e_{in} > \frac{Es(VR3 + R27)}{R31} \rightarrow \text{Logic 1 output}$$

The above equations are correct only if the logic outputs of both amplifier IC5 and comparator 14 are logic 0. A logic 1 signal from either of these sources switches the output of amplifier IC4 to logic 1. Thus the effect of the summation of the outputs of amplifiers IC3 and IC5 is to cause amplifier IC4 to operate as a "window" comparator, giving a logic 0 output when $e_{in}$ falls within a preset range corresponding to an acceptable range of vibration of the machine under test and a logic 1 output when $e_{in}$ falls outside that range. It can be seen that the upper and lower limits of the range can be altered by adjustment of a respective variable resistor VR3 or VR1.

The output of amplifier IC4 is passed to the base electrode of a transistor VT2 to switch the transistor and selectively supply current to a light emitting diode LED1. Transistor VT2 is normally off, but is switched on when a logic 1 signal appears at the output of amplifier IC4. Thus the LED indicates that vibration outside the acceptable range is occuring, but note that this does not necessarily indicate an alarm condition.

The output of amplifier IC4 is also passed to the integrator 12 which comprises an operational amplifier IC6 and associated components. The circuitry of the integrator 12 is conventional, the timing circuit comprising a feedback capacitor C5 and resistors R39, R43 and VR5. The integration rate is adjustable by means of variable resistor VR5.

A clamp circuit 13 in the form of a field effect transistor VT1 is connected between the junction of resistors R53 and R54 in the output circuit of amplifier IC6 and the inverting input of amplifier IC6. The gate electrode of transistor VT1 is connected to receive the logic output of the comparator 11. Thus when the output of comparator 11 is logic 0, the transistor VT1 is turned ON and connects the junction of resistors R53 and R54 with the input of amplifier IC6, thus effectively converting the integrator 12 into an operational amplifier with zero input and zero output.

When the output of amplifier IC4 is logic 1, indicating an alarm condition, the clamp circuit 13 is switched OFF, and the integrator 12 acts normally, giving a linearly rising positive-going output from zero at the commencement of logic 1 at its input.

The output of integrator 12 is passed to a comparator 14 via a conventional inverter circuit comprising operational amplifier IC7.

The comparator 14 comprises an operational amplifier IC8 with its associated circuitry, and is identical with the circuitry associated with amplifier IC5. The reference voltage for comparison purposes is derived from the positive supply voltage via a resistor R73. A zener diode ZD9 ensures a logic output in the same manner as for amplifier IC5. When the integrator 12 is not operating the input voltage of comparator 14 is zero, and the output is logic 0. When the integrator 12 is operating, the gradually rising voltage (now rising in a negative direction because of the inverter) is continuously compared with the reference voltage derived from the positive supply voltage. When a preset voltage is reached, the output of amplifier IC8 reverts to logic 1.

The logic 1 output of comparator 14 is passed to the base of a transistor VT5 which is thereby switched off thus interrupting the supply of current to the coil of a relay RL1. The contacts of relay RL1 are arranged to supply current to a warning bell, light or other indication of an alarm condition when transistor VT5 is switched off. It will be noted that failure of the supply will also produce the alarm condition so that the equipment has a fail-safe characteristic.

The output of amplifier IC8 is also passed, via a diode D7 (to eliminate the aforementioned logic 0 offset of 0.7V) and reset switch 15 to the input of amplifier IC4 where it is summed with the output of amplifier IC3. Provided switch 15 is closed, a logic 1 output of amplifier IC8 is passed to the input of amplifier IC4 thus clamping the output of amplifier IC4 at logic 1. Once initiated, therefore, the alarm condition continues until the switch 15 is opened to reset the circuit.

As mentioned previously, it is normally necessary to de-activate the system under certain conditions, e.g., start-up of the machine under test. This is achieved by applying a logic 1 signal to the input of the comparator 14 from an external source, thus maintaining the output of comparator 14 at logic 0 irrespective of the operation of the integrator.

The inhibit function is initiated by applying a positive voltage to the input terminal 16 of an inhibit comparator 17. The inhibit comparator comprises an operational amplifier IC9 and its associated components, and the circuit operates in a similar manner to that of amplifier IC4. According to the voltage level applied at the input terminal 16, the output of amplifier IC9 is either logic 1 or logic 0, and this voltage is summed with the output of the integrator 12 at the input of the amplifier IC7. The logic 0 offset of 0.7V at the output of amplifier IC9 is eliminated by the diode D9.

It will be seen that, in the inhibit condition, the reset line through switch 15 and the relay drive are held at the logic 0 condition, but the operation of the comparator 11 is not affected. Thus the limits of the present range can be checked without inadvertently triggering the alarm condition. This is achieved by injecting a calibration voltage into the input I/P whilst simultaneously applying a positive voltage to the terminal 16 to ensure the inhibit condition.

I claim:

1. Apparatus for the detection of vibration in rotating machinery, said apparatus comprising means for generating an electrical amplitude signal indicative of the vibration amplitude of a machine under test, a comparator connected to receive the amplitude signal and operative to generate an output signal representative of a logical 1 if the amplitude signal is above a predetermined level, the comparator giving no output signal, this condition being representative of a logical 0, if the amplitude signal is below said predetermined level; an integrator connected to integrate logical 1 output signals of the comparator when present; and a further comparator connected to the integrator output and effective to give an output when the integrator output exceeds a further predetermined level, an output from the further comparator thus being representative that the amplitude signal has persisted above the first-mentioned predetermined level for a predetermined time.

2. Apparatus according to claim 1 wherein the output from the further comparator is fed back to the input of the first mentioned comparator so that, should the signal exceed said first mentioned predetermined level for greater than said predetermined period, the apparatus will lock in this condition.

3. Apparatus as claimed in claim 1 further including an inhibit circuit which is manually actuable to inhibit operation of the apparatus.

4. Apparatus as claimed in claim 1 further including a warning indicator connected to said indicating means to provide a warning when the amplitude of said signal is at an unacceptable level.

5. Apparatus according to claim 1 wherein there is provided a clamp circuit for clamping the input and the output of the integrator to zero in the absence of a logical 1 output signal from said first mentioned comparator, the output from the further comparator thus being representative that the amplitude signal has persisted uninterrupted above the first-mentioned predetermined level for the said predetermined time.

6. Apparatus as claimed in claim 1 wherein said first-mentioned comparator is a window comparator operable to generate the said logical 1 output signal if the amplitude of said amplitude signal exceeds a first predetermined level or falls below a second pre-determined level, said window comparator giving a logical 0 output signal if the amplitude signal falls between said first and second predetermined levels.

* * * * *